United States Patent
Fine et al.

(10) Patent No.: US 9,379,841 B2
(45) Date of Patent: Jun. 28, 2016

(54) MOBILE DEVICE PREVENTION OF CONTACTLESS CARD ATTACKS

(71) Applicant: EMPIRE TECHNOLOGY DEVELOPMENT LLC, Wilmington, DE (US)

(72) Inventors: Kevin Fine, Yverdon-les-Bains (CH); Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/431,034

(22) PCT Filed: Nov. 17, 2014

(86) PCT No.: PCT/US2014/065963
§ 371 (c)(1),
(2) Date: Mar. 25, 2015

(65) Prior Publication Data
US 2016/0142174 A1 May 19, 2016

(51) Int. Cl.
*H04K 3/00* (2006.01)
*H04B 5/00* (2006.01)
*H04B 17/30* (2015.01)
*H04W 88/02* (2009.01)

(52) U.S. Cl.
CPC .............. *H04K 3/86* (2013.01); *H04B 5/0031* (2013.01); *H04B 17/30* (2015.01); *H04W 88/02* (2013.01)

(58) Field of Classification Search
USPC ................................ 455/1, 550.1, 41.1–41.3
See application file for complete search history.

(56) References Cited

U.S. PATENT DOCUMENTS

| 8,653,938 | B2 | 2/2014 | Savry et al. |
| 2009/0081943 | A1 | 3/2009 | Dobyns et al. |
| 2011/0243120 | A1 | 10/2011 | Ginsburg et al. |
| 2011/0292991 | A1 | 12/2011 | Muramatsu |
| 2013/0130614 | A1* | 5/2013 | Busch-Sorensen ...... H04K 3/86 455/1 |
| 2013/0247194 | A1* | 9/2013 | Jha ...................... H04L 63/1425 726/23 |
| 2014/0172577 | A1 | 6/2014 | Rephlo |

(Continued)

FOREIGN PATENT DOCUMENTS

| WO | 2009115997 A2 | 9/2009 |
| WO | 2013155562 A1 | 10/2013 |

OTHER PUBLICATIONS

"Chip and PIN Fraud," accessed at https://web.archive.org/web/20110913070340/http://www.youtube.com/watch?v=X7pjUlxKoEc&gl=US&hl=en&has_verified=1, uploaded on Feb. 6, 2007, pp. 2.

(Continued)

*Primary Examiner* — Fayyaz Alam
(74) *Attorney, Agent, or Firm* — Jensen & Puntigam, PS

(57) ABSTRACT

Technologies related to mobile device prevention of contactless card attacks are generally described. In some examples, a mobile computing device may monitor for electromagnetic signals at frequencies used for short range communications with contactless cards. Detection of such electromagnetic signals by the mobile computing device may indicate an attack attempt on a proximal contactless card. In response to detection of such electromagnetic signals, the mobile computing device may automatically generate a disruption signal effective to disrupt communications between contactless card readers and any proximal contactless cards, to thereby foil the attack before sensitive contactless card data is stolen.

21 Claims, 6 Drawing Sheets

(56) References Cited

U.S. PATENT DOCUMENTS

2015/0162954 A1* 6/2015 Socol .................. H04B 5/0025
 455/41.1
2015/0287289 A1* 10/2015 Lewis .................... G06K 7/084
 235/379

OTHER PUBLICATIONS

"Code of Federal Regulation," 47 Parts 0 to 19, Telecommunication, Office of the Federal Register National Archives and Records Administration, pp. 1-945 (Oct. 1, 2010).
"Contactless smart card," accessed at http://en.wikipedia.org/wiki/Contactless_smart_card, last modified on Jul. 19, 2014, pp. 7.
"Dip reader," accessed at http://en.wikipedia.org/wiki/Dip_reader, last modified on Mar. 29, 2014, p. 1.
"Documentation: Open NFC API," accessed at http://open-nfc.org/wp/home/documentation, accessed on Aug. 11, 2014, pp. 2.
"EMV," accessed at http://en.wikipedia.org/wiki/EMV, last modified on Aug. 9, 2014, pp. 19.
EMVCo, "Worldwide EMV Card and Terminal Deployment," accessed at http://www.emvco.com/about_emvco.aspx?id=202, accessed on Aug. 11, 2014, 1 page.
"How does EMV encrypt contactless transactions ?," accessed at http://nicolas.riousset.com/how-does-emv-encrypt-contactless-transactions/, accessed on Aug. 11, 2014, pp. 2.
"Near Field Communication-Interface and Protocol (NFCIP-1)," ECMA-340, 3rd Edition. pp. 1-45 (Jun. 2013).
"Near field communication," accessed at http://en.wikipedia.org/wiki/Near_field_communication, last modified on Aug. 11, 2014, pp. 16.
"EMV Payment Tokenisation Specification Technical Framework Version 1.0," EMVCo, LLC, pp. 1-84 (Mar. 2014).
"Understanding the FCC Regulations for Low-Power, Non-Licensed Transmitters," OET Bulletin 63, Office of Engineering and Technology Federal Communications Commission, pp. 34 (Oct. 1993).
"Visa Announces U.S. Participation in Global Point-of-Sale Counterfeit Liability Shift," Visa Bulletin, pp. 1-2 (Aug. 9, 2011).
"Visa says safer Chip & PIN card will make US debut," accessed at http://www.paymentscardsandmobile.com/visa-says-safer-chippin-card-will-make-us-debut/, posted on Apr. 17, 2014, pp. 2.
Emms, M., and Moorsel, A. V., "Practical Attack on Contactless Payment Cards," HCI2011 Workshop-Health, Wealth and Identity Theft, pp. 1-2 (2011).
Gummeson, J., et al., "EnGarde: Protecting the Mobile Phone from Malicious NFC Interactions," Proceeding of the 11th annual international conference on Mobile systems, applications, and services. ACM, 14 pages (Jun. 25-28, 2013).
Hancke, G.P., et al., "Confidence in Smart Token Proximity: Relay Attacks Revisited," Computers & Security, pp. 1-33 (Aug. 19, 2008).
Marsh, J., "RFID Reader Snoops Cards from 3 Feet Away," accessed at https://web.archive.org/web/20140708010328/http://hackaday.com/2013/11/03/rfid-reader-snoops-cards-from-3-feet-away/, posted on Nov. 3, 2013, pp. 15.
International Search Report with Written Opinion for International Application No. PCT/US2014/065963 mailed on Feb. 20, 2015.

* cited by examiner

US 9,379,841 B2

MOBILE DEVICE PREVENTION OF CONTACTLESS CARD ATTACKS

CROSS-REFERENCE TO RELATED APPLICATION

This Application is a National Stage Application claiming priority under 35 U.S.C. §371 of PCT Application No. PCT/US14/65963, entitled "MOBILE DEVICE PREVENTION OF CONTACTLESS CARD ATTACKS", filed on Nov. 17, 2014, which is incorporated by reference herein in its entirety.

BACKGROUND

Unless otherwise indicated herein, the materials described in this section are not prior art to the claims in this application and are not admitted to be prior art by inclusion in this section.

Cards such as credit cards, debit cards, driver's licenses and other identification cards, membership cards, gift cards, rewards cards, prepaid cards, and the like are currently undergoing a technological shift from the use of magnetic stripes, which are still widespread in the United States, toward contactless card technologies such as Radio Frequency Identification (RFID) and Near Field Communication (NFC). For example, Europay, MasterCard, Visa (EMV) cards, which are currently used in many European nations, include integrated circuits, contact plates which may be placed in contact with readers inside payment terminals, and may include NFC circuits which engage in contactless card communications with NFC readers.

While EMV cards and other next generation contactless cards are relatively more secure than their magnetic stripe counterparts, contactless cards are nonetheless vulnerable to a variety of attacks. For example, some contactless cards transmit certain account holder information to nearby card readers "in the clear", i.e., without encryption, and such information is vulnerable to so-called "skimming" attacks in which a card reader may be used to gain unauthorized access to account holder information. Contactless cards are also vulnerable to "relay" attacks, in which attackers relay communications between contactless cards and contactless card readers to engage in unauthorized transactions. In view of these and other vulnerabilities of contactless cards, there is a need for security technologies to protect contactless card holders and issuers from theft and fraud as contactless card use expands.

SUMMARY

The present disclosure generally describes technologies including devices, methods, and computer readable media relating to mobile device prevention of contactless card attacks. Some example methods may be performed by a mobile computing device comprising a contactless card communications module, such as an NFC module. The mobile computing device may monitor the contactless card communications module for passive communication mode signals comprising encoded signatures. The mobile computing device may detect, during the monitoring, a passive communication mode signal comprising an encoded signature. In response to detecting the passive communication mode signal comprising the encoded signature, the mobile computing device may automatically transmit a battery powered contactless card communications disruption signal. The disruption signal may comprise, e.g., a passive communication mode response frequency effective to disrupt communications between a proximal contactless card reader and a proximal contactless card, such as a passive contactless card subcarrier frequency modulated by a random bit stream and having a larger amplitude than a contactless card response signal generated by the proximal contactless card.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a mobile computing device comprising a contactless card communications module, a battery, a processor, a memory, and a contactless card attack preventer configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
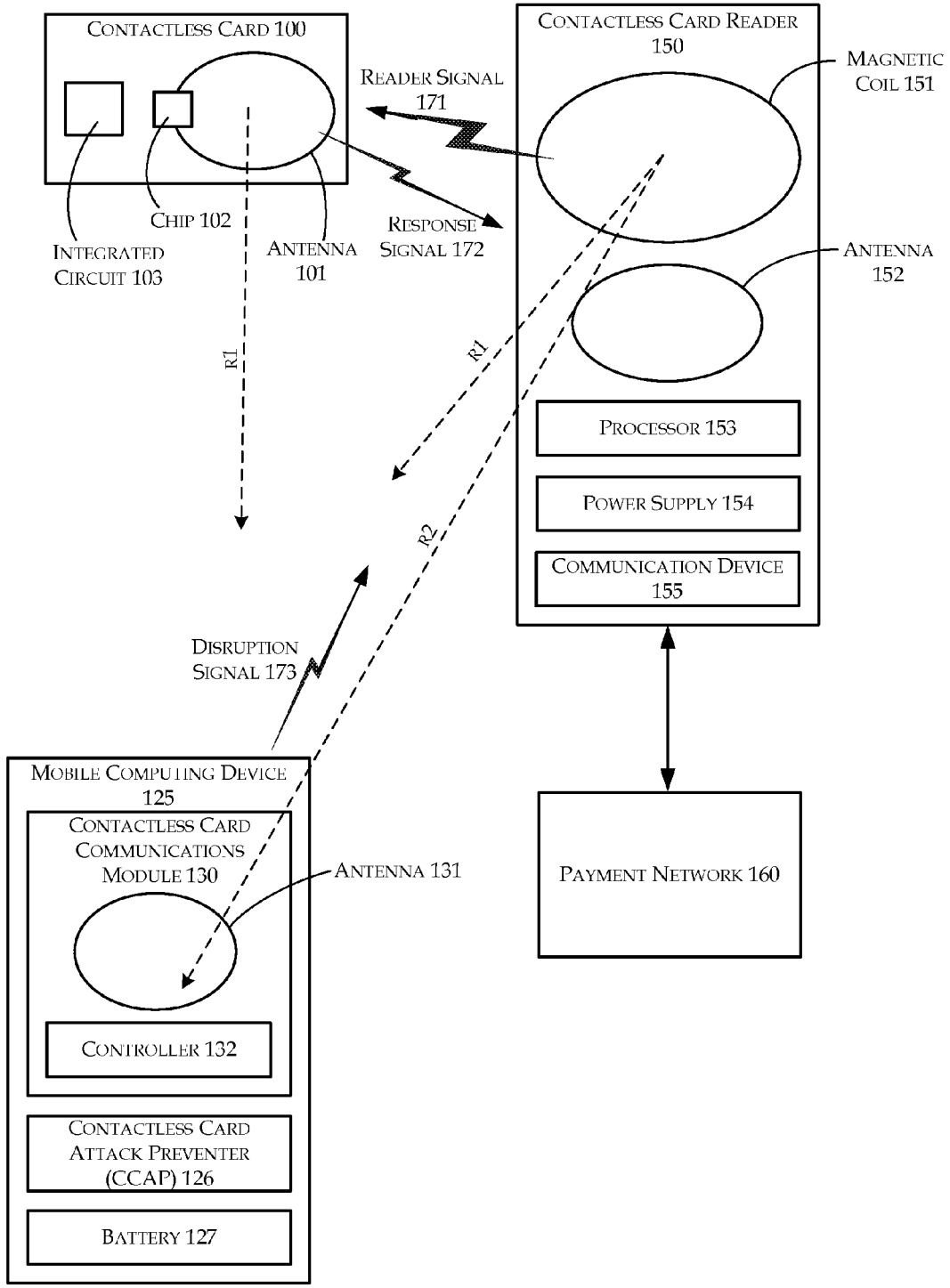
FIG. 1 is a diagram illustrating an example contactless card, contactless card reader, and mobile computing device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to mobile device prevention of contactless card attacks. In some examples, a mobile computing device may monitor for electromagnetic signals at frequencies used for short range communications with contactless cards. Detection of such electromagnetic signals by the mobile computing device may indicate an attack attempt on a proximal contactless card. In response to detection of such electromagnetic signals, the mobile computing device may automatically generate a disruption signal effective to disrupt communications between contactless card readers and any proximal contactless cards, to thereby foil the attack before sensitive contactless card data is stolen.

In some embodiments, mobile computing devices arranged according to this disclosure may be configured to detect electromagnetic signals at frequencies used for short range communications with contactless cards, regardless of whether such electromagnetic signals are generated in connection with normal contactless card communications, or alternatively, whether such electromagnetic signals are generated in connection with contactless card attack attempts. Furthermore, mobile computing devices may be configured to automatically disrupt contactless card communications in response to any detected contactless card communications. As a result, mobile computing devices arranged according to this disclosure may potentially disrupt both normal contactless card communications and contactless card attack attempts.

Disruption of normal contactless card communications may prevent or inconvenience the normal use of contactless cards, e.g., by preventing legitimate contactless card readers from effectively acquiring contactless card information. While in some circumstances disrupting normal contactless card communications may be considered desirable, e.g., in circumstances wherein the use of contactless cards is prohibited, in general disrupting normal contactless card communications may be considered undesirable. Authorized card holders desire to use their contactless cards, undisrupted, for normal and intended uses. Technologies disclosed herein may be adapted to reduce or eliminate unintended inconvenience to users of contactless cards, such as user reattempts to use contactless cards after appropriately distancing the mobile computing device and the contactless card. Some embodiments of mobile devices as described herein may be configured to reduce the possibility of disruption of normal contactless card communications, while simultaneously preventing contactless card attacks.

In some embodiments, mobile computing devices may be configured to reduce disruption of normal contactless card communications, while simultaneously preventing contactless card attacks, by calibration of mobile computing device monitoring sensitivity to electromagnetic signals used for contactless card communications.

Contactless card technologies are generally designed for short range communications. Different contactless card technologies, such as NFC, RFID, and variants thereof, may be designed for different short range communication distances. For example, NFC is currently designed for communications at distances of about 10 centimeters (10 cm) or less between an NFC card and NFC reader. Other contactless card technologies may allow for communications at distances of, e.g., about 50 cm or less, or about 1 meter (1 m) or less, between card and reader. The term "short range" as used herein, refers to a distance for which a contactless card technology is designed, understanding that different contactless card technologies are designed for different distances. Conversely, the term "long range" as used herein, refers to a distance greater than the distance for which a contactless card technology is designed, again understanding that different technologies are designed for different distances.

In some embodiments, mobile computing devices may be calibrated, if necessary, to be insensitive to contactless card communications when a mobile computing device is beyond the short range communication distance of a contactless card and/or contactless card reader. For example, mobile computing devices configured to prevent NFC attacks may be calibrated to perform monitoring in a manner that is insensitive to NFC card and/or NFC reader signals when the mobile computing device is beyond about 10 cm from an NFC card or NFC reader. By performing monitoring in a manner that is insensitive to contactless card communications from beyond the short range communication distance, embodiments may reduce the possibility of disruption of normal contactless card communications, while simultaneously preventing various types of contactless card attacks, as described herein.

In some embodiments, mobile computing devices may be calibrated, if necessary, to be insensitive to contactless card communications when the mobile computing device is at other distances from a contactless card and/or contactless card reader. For example, mobile computing devices may be calibrated to perform monitoring in a manner that is insensitive to contactless card communications when the mobile computing device is at 0.5, 0.75, 1, 1.25, 1.5, 1.75, or 2 times the short range communication distance from a contactless card and/or contactless card reader. Calibration of mobile computing devices may be unnecessary, e.g., when mobile computing devices inherently have detection capabilities which are insensitive to contactless card communications from beyond a desired distance, and which are sensitive to contactless card communications from within a desired distance.

NFC cards are used throughout this disclosure as one example of contactless cards, however, the techniques disclosed herein may be applied in connection with any contactless card technologies that are designed for short range communications. While ordinary NFC communications have a range of about 10 cm, as noted herein, NFC readers may be modified to communicate over long ranges, e.g., ranges of about 11 cm up to 1 m or more, for the purpose of attacks involving stealing NFC card information. NFC readers may be modified in this manner, e.g., to allow contactless communication between the modified NFC reader and a target NFC card, without arousing the suspicion of the target NFC card holder.

During ordinary use of an NFC card, a mobile computing device arranged according to this disclosure, such as a smartphone in a card holder's purse or pocket, may not detect NFC communication signals, since NFC cards are typically in the card holder's hand, and therefore more than 10 cm away from the smartphone in the purse or pocket, as she waves the NFC card near the NFC reader. Even when the card holder is standing very close to an NFC reader while using her NFC card, the smartphone will typically be more than 10 cm away from both the NFC reader and the NFC card. Therefore, a smartphone arranged according to this disclosure may have a calibrated sensitivity to NFC communication signals which is insensitive to ordinary and desired NFC communication signals when the smartphone and the NFC card are used in a typical manner.

In contrast, when an NFC card is not in use, the NFC card may be in a card holder's purse or pocket along with her smartphone, or the NFC card may be in the card holder's purse or pocket as she talks on the smartphone, checks her email, or interacts with one or more other applications executing on the smartphone. The smartphone and the NFC card may be close enough to each other so that, when a modified NFC reader is used in an attempt to steal NFC card information from the NFC card, a smartphone arranged according to this disclosure may likely detect either the long range communications generated by the modified NFC reader, the NFC response communications produced by the NFC card, or both. In some cases, signals from a modified NFC reader may be detectable by a smartphone at distances of up to one, two, or more meters away. Furthermore, a smartphone arranged according to some embodiments of this disclosure may be able to detect NFC response communications produced by the NFC card at an additional distance, e.g., up to 10-20 cm of additional distance, from a modified NFC reader. As a result, smartphones arranged according to some embodiments of this disclosure may protect NFC cards from modified NFC readers at distances of up to several meters, allowing for protection of NFC cards regardless of where a card holder may be carrying the smartphone and the NFC card, and allowing for protection of NFC cards in particular when the smartphone and the NFC card are both carried in a large purse, bag, or pocket.

Thus, under normal circumstances, when there is no attack attempt, a smartphone or other mobile computing device arranged according to this disclosure may not detect contactless card communications, and the mobile computing device may not therefore generate a disruption signal effective to disrupt communications with any proximal contactless cards. In contrast, in the event of an attack attempt, a mobile computing device arranged according to this disclosure may detect contactless card communications, and the mobile computing device may therefore generate a disruption signal effective to disrupt communications with any proximal contactless cards, thereby thwarting the attack.

FIG. 1 is a diagram illustrating an example contactless card, contactless card reader, and mobile computing device, arranged in accordance with at least some embodiments of the present disclosure. As depicted, FIG. 1 includes a contactless card 100, a contactless card reader 150, a mobile computing device 125, and a payment network 160. FIG. 1 also includes signals generated by the illustrated devices, including a reader signal 171 generated by contactless card reader 150, a response signal 172 generated by contactless card 100, and a disruption signal 173 generated by mobile computing device 125. FIG. 1 illustrates two different distance ranges from contactless card reader 150, including a short range distance R1 and a long range distance R2. Short range distance R1 is also illustrated from contactless card 100 in the direction of mobile computing device 125. As noted herein, short range distance R1 may generally comprise any communication distance for which a contactless card technology may be designed, and long range distance R2 may generally comprise any distance greater than that for which a contactless card technology may be designed.

With reference to FIG. 1, an ordinary contactless card 100 transaction may involve contactless card reader 150 generating reader signal 171, wherein reader signal 171 comprises a short range signal with range R1. Contactless card 100 may receive reader signal 171 and may generate response signal 172, wherein response signal 172 may also comprise a short range signal with range R1. Contactless card reader 150 may receive response signal 172. Response signal 172 may include contactless card information, such as card holder name, account number, and/or other information. Contactless card reader 150 may receive contactless card information encoded in response signal 172, and contactless card reader 150 may use the received contactless card information to process a transaction. For example, contactless card reader 150 may initiate a payment from an identified account number, by sending the account number, transaction amount, and/or other information to payment network 160.

In such ordinary contactless card 100 transactions, mobile computing device 125 may generally not be within range R1, because contactless card users normally do not hold contactless card 100 and mobile computing device 125 in the same hand when waiving contactless card 100 near contactless card reader 150. Therefore, neither reader signal 171 nor response signal 172 may reach mobile computing device 125 with sufficient strength to be detected by mobile computing device 125, and mobile computing device 125 may therefore not detect reader signal 171 or response signal 172. Therefore, in ordinary transactions, mobile computing device 125 may generally not generate disruption signal 173, and ordinary transactions may be handled normally and without disruption or interference from mobile computing device 125.

In a variety of attack scenarios, mobile computing device 125 may be configured to generate disruption signal 173 responsive to detecting reader signal 171 and/or response signal 172, and disruption signal 173 may be effective to foil the attack. Mobile computing device 125 may comprise, inter alia, a contactless card communications module 130, a Contactless Card Attack Preventer (CCAP) 126, and a battery 127. Contactless card communications module 130 may comprise, inter alia, an antenna 131 and a controller 132. In NFC embodiments, contactless card communications module 130 may comprise an NFC module, and controller 132 may comprise an NFC controller. Contactless card communications module 130 may be calibrated, if necessary, to be insensitive to reader signal 171 and response signal 172 at long range, e.g., beyond R1, and to be sensitive to reader signal 171 and response signal 172 at short range, e.g., within R1.

In some embodiments, CCAP 126 may be configured to monitor contactless card communications module 130 for reader signal 171 and/or response signal 172. CCAP 126 may be configured to detect, during the monitoring of contactless card communications module 130, reader signal 171 and/or response signal 172. In response to detecting reader signal 171 and/or response signal 172, CCAP 126 may be configured to cause mobile computing device 125 to automatically transmit disruption signal 173 via contactless card communications module 130. Disruption signal 173 may comprise, e.g., a battery powered signal produced by coupling energy from battery 127 into contactless card communications module 130.

In some example attack scenarios, contactless card reader 150 may be modified to generate reader signal 171 at a higher power, thereby imparting long range R2 to reader signal 171. As a result of the higher power of reader signal 171, response signal 172 may also potentially also comprise a higher power and longer range, e.g., longer than a typical NFC range. Reader signal 171 and/or response signal 172 may therefore be detected at mobile computing device 125.

Mobile computing device 125 may be configured to generate disruption signal 173 responsive to detecting reader signal 171 and/or response signal 172. Disruption signal 173 may interfere with response signal 172 at contactless card reader 150. Disruption signal 173 may therefore prevent contactless card information, such as card holder name, account number, or other information, from being successfully received at contactless card reader 150. Disruption signal 173 may thereby foil the attempted attack on contactless card 100.

In some example attack scenarios, contactless card reader 150 may generate reader signal 171 at a normal power, thereby imparting a normal, short range R1 to reader signal 171. However, a determined attacker may find an opportunity to place contactless card reader 150 at a distance of R1 or less from contactless card 100.

In such attack scenarios, it is unlikely that contactless card 100 may be in the card holder's hand. Instead, contactless card 100 is more likely in the card holder's pocket or purse, and the attacker may sit or stand next to the cardholder in a crowded area such as on a bus, subway train, event venue, or store checkout line. There is at least some significant probability that contactless card 100 may be sufficiently near mobile computing device 125, such that both contactless card 100 and mobile computing device 125 would be within range R1 from contactless card reader 150. Otherwise, there is at least some significant probability that mobile computing device 125 may be sufficiently near contactless card 100, such that mobile computing device 125 may be within range R1 or less from contactless card 100, and mobile computing device 125 may detect response signal 172.

Therefore, in attack scenarios involving normal power reader signals, there is at least some significant probability that reader signal 171 and/or response signal 172 may nonetheless be detected at mobile computing device 125. Mobile computing device 125 may generate disruption signal 173 to foil the attack on contactless card 100, similar to attack scenarios involving modified, high power contactless card readers.

In some example attack scenarios, contactless card reader 150 may generate reader signal 171 at a normal power, thereby imparting a normal, short range R1 to reader signal 171. However, a relay device (not shown) may be used to undertake a relay attack on contactless card 100, even when contactless card may be outside of range R1 and/or R2. An example relay device may include a fake contactless card which may be communicatively coupled with a signal repeater. The fake contactless card may be placed near contactless card reader 150, and the signal repeater may be placed near contactless card 100. The relay device may then communicate reader signal 171 to contactless card 100; the relay device may receive response signal 172 from contactless card 100; and the relay device may communicate response signal 172 to contactless card reader 150 to carry out an unauthorized contactless card 100 transaction.

In such attack scenarios, there is at least some significant probability that either the signal repeater may transmit reader signal 171 with a high power and long range sufficient to be detected at mobile computing device 125, or that mobile computing device 125 may be sufficiently near contactless card 100 to nonetheless detect reader signal 171 and/or response signal 172 as described in connection with other attack scenarios herein. Mobile computing device 125 may generate disruption signal 173 to foil the attack on contactless card 100, similar to the other attack scenarios described herein. In relay attack scenarios, the relay device may relay the combined response signal 172 and disruption signal 173 to contactless card reader 150, and contactless card reader 150 may be rendered unable to extract contactless card information from received signal information.

Contactless card 100 and contactless card reader 150 may implement any available contactless card technologies and/or contactless card technologies which may be developed subsequent to this disclosure. Currently available contactless card technologies include, e.g., RFID and NFC technologies, each of which is defined by a variety of technical specifications. The technical specifications are updated and modified on an ongoing basis by the authorities responsible for RFID, NFC, and supporting standards. Contactless card 100 and contactless card reader 150 may implement any RFID and/or NFC technical specification, as will be appreciated by those of skill in the art.

In some embodiments, contactless card technologies included in contactless card 100 may comprise an antenna 101 and a chip 102. Contactless card 100 may optionally also include an integrated circuit 103, such as included in EMV cards. Contactless card 100 may furthermore optionally include any other technologies, including technologies that implement contact-based and/or contactless card functions.

Contactless cards comprising integrated circuits may be referred to herein as Proximity Integrated Circuit Cards (PICCs). Integrated circuit 103 may comprise, e.g., a processor for cryptographic functions and a memory that can change its value in response to received communications. In some embodiments, integrated circuit 103 may implement a shared secret authentication protocol, in which a shared secret is used at both the contactless card and the contactless card reader, however the shared secret is not revealed in communications between the contactless card and the contactless card reader. In some embodiments, integrated circuit 103 may be coupled with a contact plate for contact-based communications with integrated circuit 103. The contact plate may be pressed against, e.g., a dip reader inside a payment terminal. The payment terminal may provide electrical current through contacts on the contact plate to power integrated circuit 103. Contactless cards comprising contact plates may be considered "dual use" cards which may be used in both contact-based payment terminals as well as with contactless card readers.

Contactless card reader 150 may be referred to herein as a Proximity Coupling Device (PCD). In some embodiments, contactless card technologies included in contactless card reader 150 may comprise, inter alia, a magnetic coil 151, an antenna 152, a processor 153, a power supply 154, and a communication device 155. Contactless card reader 150 may be configured to apply electrical power from power supply 154 to magnetic coil 151 to generate reader signal 171. Reader signal 171 may comprise a magnetic field having a desired frequency. The magnetic field of reader signal 171 may inductively couple energy into antenna 101 at contactless card 100 to power chip 102. Chip 102 may be configured to switch a circuit element, such as one or more resistors or capacitors inside chip 102 (not shown), in and out of a circuit including antenna 101. Chip 102 may switch the circuit element(s) to modulate reader signal 171, thereby generating a modulated magnetic field comprising response signal 172. Contactless card reader 150 may be configured to receive response signal 172 at antenna 152. Processor 153 may be configured to extract contactless card information from response signal 172. Contactless card reader 150 may then optionally initiate a transaction, e.g., by sending contactless card information along with any other transaction information to payment network 160.

Contactless card reader 150 and/or payment network 160 may optionally include any of a variety of parameters regarding allowable contactless card transactions. For example, in some embodiments, contactless card reader 150 may require entry of a Personal Identification Number (PIN) for contactless card payments exceeding a predetermined monetary value, such as $100.

Communications between contactless card reader 150 and contactless card 100 may or may not be encrypted, and may or may not make use of tokens. Currently, various contactless card technologies do not use encryption or tokens for contactless card communications, and contactless card attacks may extract critical information in unencrypted form, such as, for example, card holder name, 16 digit Primary Account Number (PAN), expiration date, and issue date of contactless cards. Furthermore, cameras may be employed to capture 3-digit Card Verification Value (CVV) codes printed on the backs of contactless cards to gather sufficient information for online purchases. While encryption and tokens may render contactless card communications more secure, such measures would not prevent all of the various possible contactless card attacks. Embodiments of this disclosure may be usefully employed in scenarios involving no encryption or tokens, as well as in scenarios involving the use of encryption and/or tokens in contactless card communications.

In an example comprising an NFC card as contactless card 100 and an NFC reader as contactless card reader 150, the NFC card and NFC reader may communicate in passive communication mode. NFC includes two communication modes: passive and active. Passive communication mode is generally employed in scenarios wherein a node, such as the NFC card, does not include a power supply such as a battery, and so the NFC card is instead powered inductively via the reader signal 171. In contrast, active communication mode communications are generally employed in scenarios wherein both nodes include power supplies and are therefore less restricted in available processing and transmission power.

In passive communication mode, the NFC reader and NFC card may implement, e.g., a Radio Frequency (RF) interface such as described in the ISO/IEC 14443 standard. In some embodiments, the NFC reader may employ magnetic coil 151 to generate reader signal 171 comprising a magnetic field at 13.56 MHz. The NFC reader may employ Amplitude Shift Keying (ASK) modulation of the 13.56 MHz reader signal to communicate with the NFC card. The NFC reader may employ such modulation to communicate any information to the NFC card. For example, in some embodiments the NFC reader may modulate the 13.56 MHz reader signal as illustrated in FIG. 2.

Figure 2:
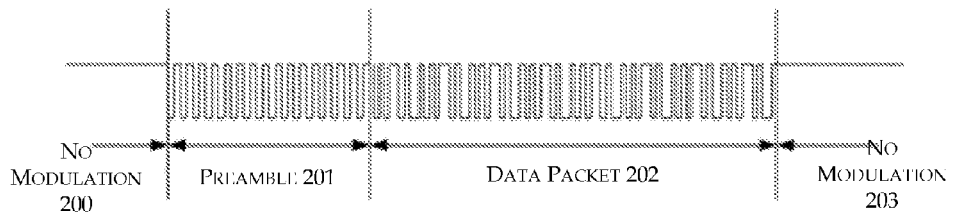
FIG. 2 is a diagram illustrating example passive communication mode NFC signals comprising encoded signatures.

FIG. 2 is a diagram illustrating example passive communication mode NFC signals comprising encoded signatures, arranged in accordance with at least some embodiments of the present disclosure. The illustrated NFC signals may be produced by the NFC reader, e.g., by ASK modulation of a 13.56 MHz reader signal as described herein. FIG. 2 illustrates an initial "No Modulation" segment 200, a "Preamble" segment 201, a "Data Packet" segment 202, and a subsequent "No Modulation" segment 203. Preamble 201 may comprise, e.g., 48 zeroes modulated onto the carrier frequency. Data packet 202 may comprise, e.g., any data for transmission to or from the NFC card. Preamble 201 and/or data packet 202 may comprise encoded signatures as described further in connection with FIG. 3.

The 13.56 MHz reader signal generated by the NFC reader may inductively couple power into a receive coil implemented, e.g., by antenna 101 at the NFC card. The NFC card may be configured to rectify the Radio Frequency (RF) voltage induced at the receive coil to Direct Current (DC) to power chip 102, integrated circuit 103, and/or other contactless card electronics. The NFC card may generate response signal 172 by switching a circuit element as described herein, to thereby load modulate the 13.56 MHz reader signal. In some embodiments, the NFC card may generate a subcarrier frequency signal having a frequency of about ±847.5 kHz, i.e., frequencies between 12.71 and 14.41 MHz, inclusive. The NFC card may modulate the subcarrier frequency signal to carry a bit stream, e.g., a bit stream with a bit rate of 106, 212, or 424 kilobits per second (kbp/s), as described in the ISO/IEC 14443 standard, to thereby transmit contactless card information to the NFC reader. In some embodiments, contactless card information may be packaged into NFC messages such as defined in the ISO/IEC 18092 standard. NFC technologies include multiple NFC card types, currently including type A and type B cards, and the NFC card may comprise either card type.

Figure 3:
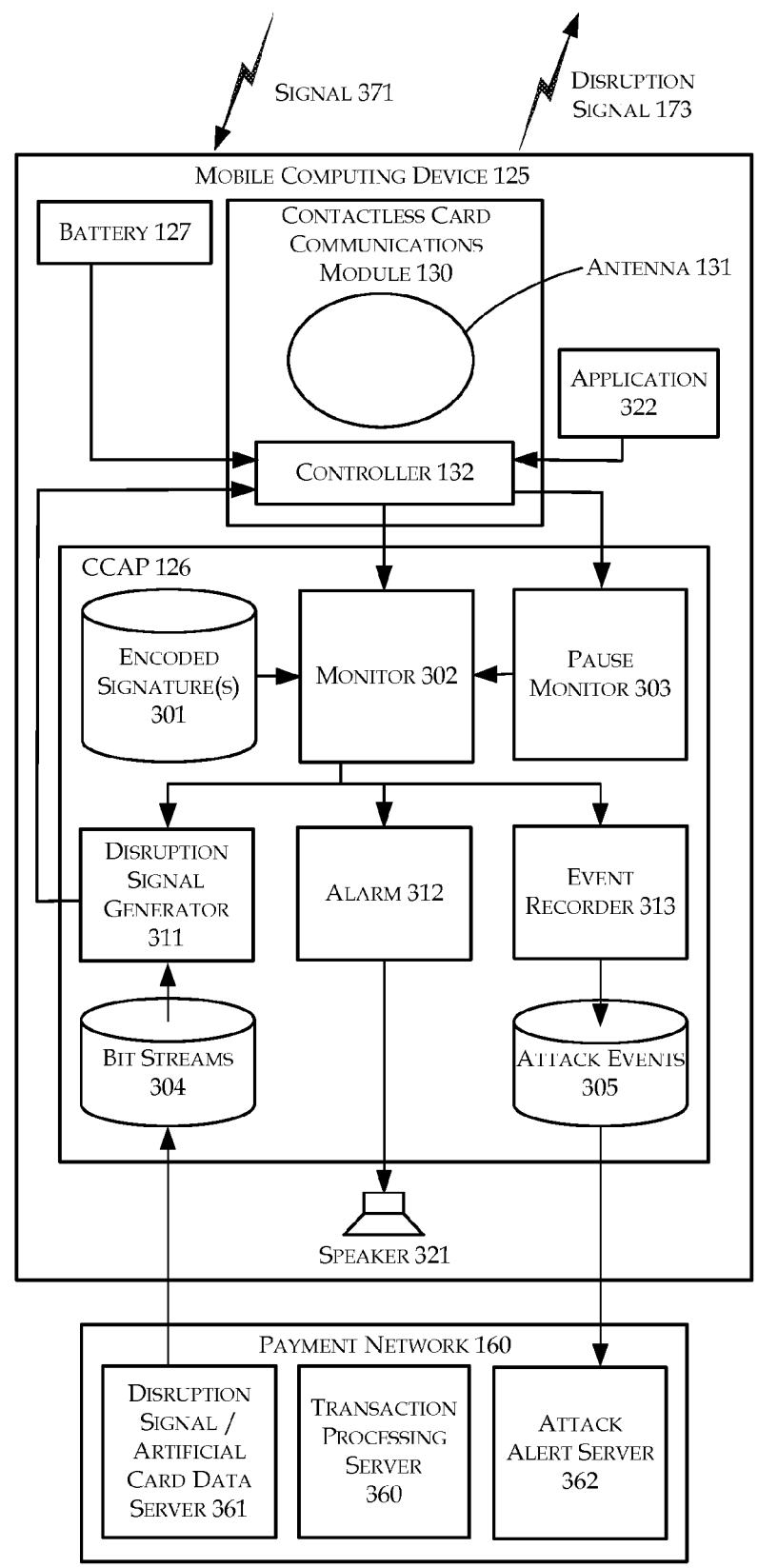
FIG. 3 is a diagram illustrating an example mobile computing device.

FIG. 3 is a diagram illustrating an example mobile computing device, arranged in accordance with at least some embodiments of the present disclosure. FIG. 3 provides a more detailed view of mobile computing device 125 introduced in FIG. 1, where like elements are assigned like identifiers. As depicted, FIG. 3 comprises, inter alia, example components included in CCAP 126. CCAP may comprise encoded signature(s) 301, a monitor 302, a pause monitor 303, a disruption signal generator 311 and bit streams 304, an alarm 312, an event recorder 313, and attack events 305. FIG. 3 also illustrates a speaker 321 and an application 322 included within mobile computing device 125. A signal 371 may arrive at mobile computing device 125, and mobile computing device 125 may generate disruption signal 173 as illustrated in FIG. 1. Mobile computing device 125 may be configured to interact with remote servers such as may be included in payment network 160, including, e.g., a disruption signal/artificial card data server 361 and an attack alert server 362. Payment network 160 may also include a transaction processing server, e.g., to process transactions submitted by contactless card readers, such as contactless card reader 150 illustrated in FIG. 1.

In FIG. 3, signal 371 may comprise, e.g., reader signal 171 and/or response signal 172, or any portion thereof. Thus for example, signal 371 may comprise a passive communication mode NFC signal such as a 13.56 MHz reader signal or a 13.56 MHz signal as modulated by an NFC reader or an NFC card, respectively.

Monitor 302 may be configured to monitor contactless card communications module 130 (also referred to herein as an NFC module) for passive communication mode NFC signals comprising encoded signature(s) 301. In some embodiments, monitor 302 may operate substantially continuously, e.g., in the background as a user of mobile computing device 125 goes about their daily business. For example, monitor 302 may operate over at least one period of 10 minutes or longer, and up to several hours or for as long as mobile computing device 125 remains on.

Encoded signature(s) 301 may include to any patterns or sequences as may be encoded in modulated signals, which monitor 302 may be configured to detect within incoming signals such as signal 371. In some embodiments, when signal 371 arrives at contactless card communications module 130, monitor 302 may be configured to compare signal 371 with encoded signature(s) 301, to determine whether signal 371 includes encoded signature(s) 301.

In some embodiments, preamble 201 or a portion thereof may be used as an encoded signature. In some embodiments, encoded signatures may be defined generically such that any bit stream on 13.56 MHz reader signal and/or any bit stream on a 13.56 MHz reader signal modulated by a ±847.5 kHz response signal. In some embodiments, information from data packet 202 and/or information included in response signal 172, or portions thereof, may be used as encoded signatures. In some embodiments, encoded signatures may comprise signal modulation patterns used in transmission of NFC messages such as defined in the ISO/IEC 18092 standard.

In some embodiments, encoded signatures may comprise signal modulation patterns used for transmission of contactless card information. For example, contactless card information generated at, and transmitted from, a proximal PICC (proximal to mobile computing device 125) may comprise encoded signatures matching encoded signature(s) 301 which mobile computing device 125 may be configured to detect. Embodiments may strategically select contactless card information for use as an encoded signature, in order to tailor circumstances under which CCAP 126 may prevent attacks. For example, in some embodiments, contactless card information which may be common to substantially all contactless cards, or a majority of contactless cards, may be used as an encoded signature in order to disrupt substantially all or most detected contactless card communications. In some embodiments, contactless card information which may be used in connection with NFC cards, or another card type, such as RFID cards, payment cards, or identification cards, may be used as an encoded signature in order to disrupt contactless card communications for selected card types. In some embodiments, contactless card information which may be used in connection with contactless cards from a particular card issuer, such as a bank or credit card issuer, may be used as an encoded signature in order to disrupt contactless card communications for the particular card issuer. In some embodiments, contactless card information which may be used in connection with cards belonging to certain card holders, such as card holder name or other card holder specific contactless card information, may be used as an encoded signature in order to disrupt contactless card communications for selected card holders. In some embodiments, contactless card information which may be used in connection with certain specific contactless cards, such as an expiration date or other contactless card-specific information, may be used as an encoded signature in order to disrupt contactless card communications for selected contactless cards. Other encoded signatures may be strategically selected according to the teachings herein to disrupt contactless card communications under any desired circumstances, as will be appreciated with the benefit of this disclosure.

In some embodiments, CCAP 126 may be configured to update encoded signatures 301. For example, CCAP 126 may provide a UI to allow user customization of encoded signatures 301. The UI may allow, e.g., user entry of contactless card information for use as encoded signatures 301, to allow users to select which contactless cards to protect with CCAP 126. In some embodiments, CCAP 126 may be configured to automatically retrieve contactless card information from a server for use as encoded signatures. The retrieved contactless card information may optionally be associated with contactless cards associated with a user account. In some embodiments, CCAP 126 may be configured to occasionally update encoded signatures 301, e.g., when new encoded signatures 301 are distributed to mobile devices equipped with CCAP 126.

Monitor 302 may be adapted to detect when signal 371 comprises an encoded signature matching encoded signature(s) 301. In response to detecting signal 371 comprising encoded signature(s) 301, CCAP 126 may be configured to automatically activate disruption signal generator 311, alarm 312, and/or event recorder 313.

When activated in response to detection of signal 371 comprising encoded signature(s) 301, disruption signal generator 311 may be configured to use contactless card communications module 130 to transmit disruption signal 173. Disruption signal generator 311 may for example send a command to controller 132 to transmit disruption signal 173. In some embodiments, the command to controller 132 may comprise a disruption signal waveform for transmission by contactless card communications module 130, or the command to controller 132 may comprise a pointer to a memory location comprising the disruption signal waveform, or other information for use by contactless card communications module 130 in generating disruption signal 173.

In contrast with typical passive communication mode response signals, which may be produced by load modulation of incoming reader signals, disruption signal 173 may comprise a battery-powered signal. Contactless card communications module 130 may be configured to couple energy from battery 127 into antenna 131 to generate disruption signal 173. In some embodiments, mobile computing device 125 may generate a battery-powered disruption signal 173 comprising a larger amplitude than a response signal generated by a proximal PICC. The larger amplitude of disruption signal 173 may facilitate disruption of a weaker, smaller amplitude response signal generated by the proximal PICC.

In some embodiments, disruption signal 173 may comprise a passive communication mode NFC response frequency. For example, in NFC embodiments, disruption signal 173 may comprise a 13.56 MHz signal modulated by ±847.5 kHz sidebands. In some embodiments, disruption signal 173 may be modulated by a bit stream in order to further interfere with any bit stream included in a response signal from a contactless card. For example, disruption signal generator 311 may be adapted to generate a random bit stream, at any desired bit rate such as 106, 212, or 424 kbps, and disruption signal generator 311 may provide the random bit stream to contactless card communications module 130 to modulate disruption signal 173 by the random bit stream.

In some embodiments, disruption signal generator 311 may be adapted to retrieve a bit stream from stored bit streams 304, and to use the retrieved bit stream to modulate disruption signal 173. For example, disruption signal generator 311 may be adapted to retrieve a bit stream corresponding to an encoded signature detected in signal 371, or to retrieve a bit stream loaded in bit streams 304 by disruption signal/artificial card data server 361. Bit streams 304 may be adapted to receive bit stream updates from disruption signal generator 311 and/or from disruption signal/artificial card data server 361.

In some embodiments, disruption signal 173 may be modulated by a bit stream including artificial PICC data. Artificial PICC data may include, e.g., an artificial card holder name, artificial PAN, artificial expiration date, and/or artificial variants of any other PICC data, wherein the artificial PICC data includes PICC data different from card holder PICC data associated with a proximal PICC. The proximal PICC may comprise, e.g., a PICC owned by a card holder who is also the owner of mobile computing device 125, and who may keep both PICC and mobile computing device 125 in her pocket or purse. Artificial PICC data may comprise different data from that of the proximal PICC.

In some embodiments, artificial PICC data may be generated by disruption signal/artificial card data server 361 and loaded into bit streams 304 for the purpose of catching attempts to steal contactless card information. For example, disruption signal/artificial card data server 361 may be configured load to load artificial PICC data into bit streams 304 and to provide artificial PICC data to transaction processing server 360. Transaction processing server 360 may be configured to take any of a variety of actions in response to receiving transaction data comprising artificial PICC data, as described further in connection with FIG. 7.

In embodiments wherein disruption signal 173 includes artificial PICC data, mobile computing device 125 may be adapted to generate disruption signal 173 at a sufficiently large amplitude to not only disrupt, but to also effectively replace any genuine contactless card information as may be included in weaker, smaller amplitude response signals generated by proximal PICCs. A sufficiently large amplitude disruption signal 173 may be received and processed by contactless card reader 150 despite interference from proximal PICCs. However, in circumstances wherein disruption signal 173 does not effectively replace smaller amplitude response signals, disruption signal 173 may nonetheless interfere with contactless card response signals and therefore foil attack.

When activated in response to detection of signal 371 comprising encoded signature(s) 301, alarm 312 may be configured to automatically activate speaker 321 to sound an audible alarm. The audible alarm may comprise any desired alarm sounds or speech. For example, an alarm may recite a prerecorded message such as "Caution, identity theft detected". In some embodiments, CCAP may be configured to provide a settings User Interface (UI) including alarm settings. The alarm settings may allow, e.g., switching the audible alarm on and off, setting alarm volume, and selecting a desired alarm sound or message.

When activated in response to detection of signal 371 comprising encoded signature(s) 301, event recorder 313 may be configured to automatically record event information for detected signal 371, e.g., by recording event information in attack events 305. In some embodiments, recorded event information may comprise Global Positioning System (GPS) location of mobile computing device 125 at the time of detected signal 371, date and time information at the time of detected signal 371, any information encoded in detected signal 371 including any encoded signatures identified in detected signal 371, whether disruption signal 173 was transmitted in response to detected signal 371 and any bit streams 304 or artificial card data included in disruption signal 173, and/or whether alarm 312 was activated in response to detected signal 371.

In some embodiments, CCAP 126 may be configured to automatically send an attack alert communication in response to detection of signal 371 comprising encoded signature(s) 301. CCAP 126 may for example notify attack alert server 362 of attack events. In some embodiments, event recorder 313 may be configured to transmit attack event information to attack alert server 362. In some embodiments, CCAP 126 may be configured to notify attack alert server 362 of attack events in real time, in response to detection of signal 371 comprising encoded signature(s) 301. In some embodiments, CCAP 126 may be configured to notify attack alert server 362 of attack events when convenient, e.g., when mobile computing device 125 has a Wi-Fi connection to the internet. In some embodiments, CCAP 126 may be configured to notify attack alert server 362 of attack events periodically, such as daily, weekly or monthly, when unreported attack event information is present in attack events 305. Attack alert server 362 may be configured to aggregate and analyze received attack event information and/or to take any of a variety of actions in response to receiving attack event information, as described further in connection with FIG. 8.

Pause monitor 303 may be configured to pause monitoring operations of monitor 302 during use of contactless card communications module 130 by application 322. Application 322 may comprise, e.g., any NFC enabled application installed at mobile computing device. Application 322 may be adapted to use contactless card communications module 130 (also referred to herein as NFC module) for any of the wide variety of purposes to which NFC may be applied. For example, in some embodiments, application 322 may comprise a digital wallet application adapted to use NFC to make payments.

In some embodiments, pause monitor 303 may be configured to detect when application 322 connects with controller 132. Pause monitor 303 may responsively stop monitoring operations of monitor 302, to avoid interfering with NFC communications of application 322. Pause monitor 303 may set a timer when monitor 302 is stopped. The timer may be set for a time interval such as one minute, two minutes, or any other appropriate time interval. When the time interval elapses, pause monitor 303 may be configured to restart monitor 302. In some embodiments, pause monitor 303 may be configured to periodically check whether application 322 retains control of contactless card communications module 130, and pause monitor 303 may restart monitor 302 after application 322 relinquishes control of contactless card communications module 130.

Figure 4:
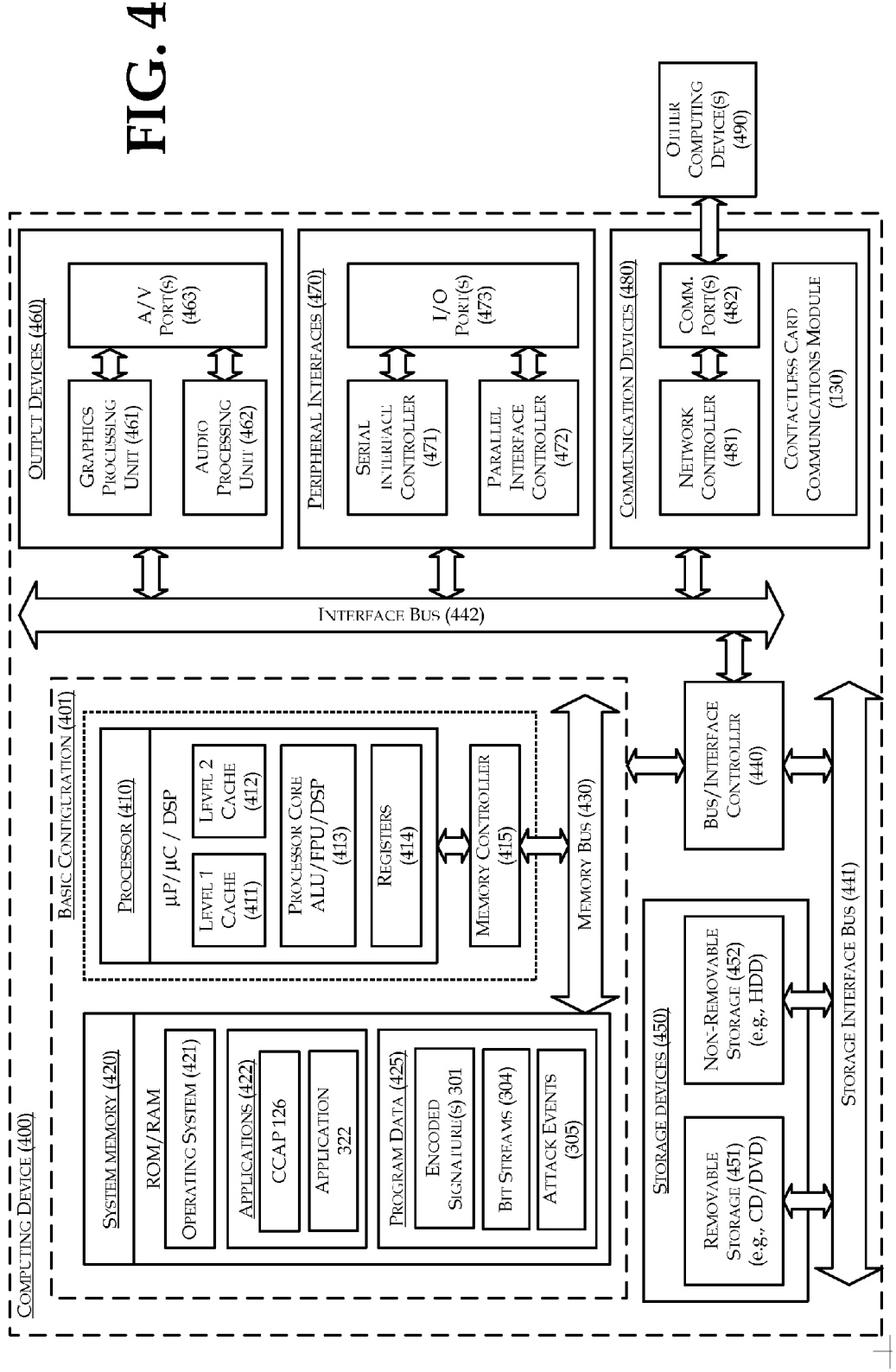
FIG. 4 is a block diagram of a computing device as one example of a mobile computing device.

FIG. 4 is a block diagram of a computing device 400 as one example of a mobile computing device, arranged in accordance with at least some embodiments of the present disclosure. As depicted, in a very basic configuration 401, computing device 400 may include one or more processors 410 and system memory 420. A memory bus 430 may be used for communicating between the processor 410 and the system memory 420.

Depending on the desired configuration, processor 410 may be of any type including but not limited to a microprocessor (µP), a microcontroller (µC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 may also be used with the processor 410, or in some implementations the memory controller 415 may be an internal part of the processor 410.

Depending on the desired configuration, the system memory 420 may be of any type including but not limited to volatile memory (such as RAM), non-volatile memory (such as ROM, flash memory, etc.), or any combination thereof. System memory 420 typically includes an operating system 421, one or more applications 422, and program data 425. In some embodiments, operating system 421 may comprise a virtual machine that is managed by a Virtual Machine Manager (VMM). Applications 422 may include, for example, CCAP 126 module(s) and application 322 module(s). In some embodiments, CCAP 126 module(s) may be within operating system 421 rather than applications 422. Program data 425 may include encoded signature(s) 301, bit streams 304, and attack events 305 that may be used by CCAP 126 as described in connection with FIG. 3.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disc drives such as compact disc (CD) drives or digital versatile disc (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data. Computing device 400 may also comprise a battery, such as illustrated in FIG. 3, which is omitted from FIG. 4 to allow illustration of other aspects of computing device 400.

Level 1 cache 411, level 2 cache 412, system memory 420, removable storage 451, and non-removable storage devices 452 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium that may be used to store the desired information and that may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 may include a serial interface controller 471 or a parallel interface controller 472, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 473. Other conventional I/O devices may be connected as well such as a mouse, keyboard, and so forth. Communication devices 480 may include contactless card communications module 130, in addition to any other communications devices such as network controller 481, which may be arranged to facilitate communications with one or more other computing devices 490 over a network communication via one or more communication ports 482. Other computing devices 490 may include, e.g., disruption signal/artificial card data server 361 and/or attack alert server 362, as illustrated in FIG. 3.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

In some embodiments, computing device 400 may be implemented as a smartphone. Computing device 400 may also be implemented as a tablet, laptop, or wearable device such as a wristwatch. Computing device 400 may also be implemented as special purpose device for protecting contactless cards.

Figure 5:
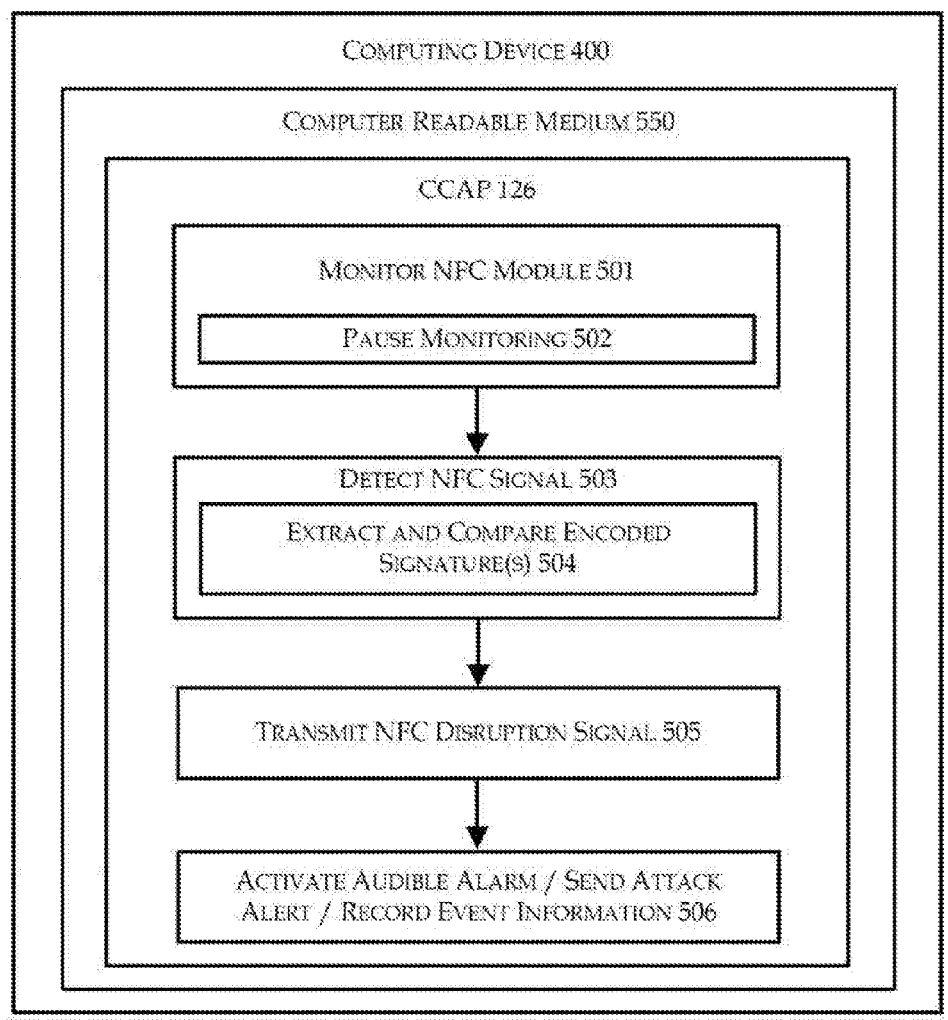
FIG. 5 is a flow diagram illustrating an example method configured to prevent contactless card attacks.

FIG. 5 is a flow diagram illustrating an example method configured to prevent contactless card attacks, arranged in accordance with at least some embodiments of the present disclosure. As depicted, the example flow diagram may include one or more operations/modules of CCAP 126, as illustrated by blocks 501-506, which represent operations as may be performed in a method, functional modules in computing device 400, and/or instructions as may be recorded on a computer readable medium 550.

In FIG. 5, blocks 501-506 are illustrated as including blocks being performed sequentially, e.g., with block 501 first and block 506 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 illustrates an example method by which computing device 400 may prevent contactless card attacks. FIG. 5 uses NFC card technologies as an example, understanding that the NFC example may be applied in the context of other contactless card technologies. Methods according to FIG. 5 may generally include monitoring an NFC module by computing device 400. When an NFC signal is detected, computing device 400 may responsively transmit an NFC disruption signal to prevent proximal NFC readers from receiving information in NFC card response signals.

At a "Monitor NFC Module" block 501, computing device 400 may monitor an NFC module within computing device 400 for passive communication mode NFC signals comprising encoded signatures. Block 501 may be performed substantially continuously by computing device 400, e.g., substantially continuously over at least one period of several minutes up to 10 minutes or longer. The term "substantially continuously" as used herein allows for occasional brief interruptions, e.g., pauses in monitoring due to operation of block 502. The passive communication mode NFC signals monitored at block 501 may comprise, e.g., 13.56 MHz signals generated by a proximal PCD and/or or 12.7 MHz-14.40 MHz sideband signals generated by a proximal PICC. Block 501 may include block 502.

At a "Pause Monitoring" block 502, computing device 400 may pause monitoring of the NFC module pursuant to block 501 during use of the NFC module by an NFC application at computing device 500. The term "pause" as used herein, includes a temporary stop. Block 502 may restart monitoring of the NFC module pursuant to block 501 after any predetermined pause interval, or for example after the NFC application relinquishes control of the NFC module. Block 502 may operate as many times as necessary during monitoring at block 501. For example, block 502 may operate each time any NFC application installed at computing device 400 uses the NFC module at computing device 400. Blocks 501 and 502 may be followed by block 503.

At a "Detect NFC Signal" block 503, computing device 400 may detect, during the monitoring of the NFC module at block 501, a passive communication mode NFC signal comprising an encoded signature. In some embodiments, block 503 may detect the passive communication mode NFC signal, e.g., by operation of the NFC module to notify and/or relay received NFC signals, received during monitoring pursuant to block 501, to CCAP 126. In some embodiments, the NFC module may not notify CCAP 126 when signals other than passive communication mode NFC signals are received at the NFC module. In some embodiments, the NFC module may notify CCAP 126 when any signals are received, and CCAP 126 may analyze received signals to determine whether they comprise passive communication mode NFC signals, namely, signals having frequencies used for NFC in passive communication mode.

The passive communication mode NFC signal detected at block 503 may comprise, e.g., a 13.56 MHz signal generated by a proximal PCD and/or a 12.7 MHz-14.40 MHz sideband signal generated by a proximal PICC. The encoded signature may comprise any signal modulation pattern, carried on the passive communication mode NFC signal, which computing device 400 is configured to detect. A variety of example encoded signatures are disclosed herein, including, e.g., encoded signatures comprising at least a portion of a passive communication mode NFC preamble generated by a proximal PCD; encoded signatures comprising a passive communication mode NFC preamble including a sequence of 48 zeroes generated by a proximal PCD; and/or encoded signatures comprising contactless card information generated by a proximal PICC. Block 503 may include block 504.

At an "Extract and Compare Encoded Signature(s)" block 504, computing device 400 may, e.g., extract information encoded in the passive communication mode NFC signal detected at block 503, and compare the extracted information to encoded signature(s) stored at computing device 400. In some embodiments, computing device 400 may extract substantially all information encoded in the passive communication mode NFC signal detected at block 503, and compare the extracted information to encoded signature(s) stored at computing device 400. Computing device 400 may thereby determine whether information extracted from the detected passive communication mode NFC signal comprises any of the encoded signature(s) which computing device 400 may be configured to detect, such as any of the example encoded signatures described herein. When the detected passive communication mode NFC signal comprises such encoded signature(s), blocks 503 and 504 may be followed by block 505. Otherwise, when the detected passive communication mode NFC signal does not comprise such encoded signature(s), CCAP 126 may return to monitoring at block 501 without transmitting an NFC disruption signal.

In some embodiments, blocks 503 and 504 may be modified so that computing device 400 may proceed to block 505 regardless of whether a detected passive communication mode NFC signal comprises an encoded signature. Such embodiments may, e.g., transmit an NFC disruption signal in response to any detected passive communication mode NFC signal. Such embodiments may also optionally decode and store information included in detected passive communication mode NFC signals, e.g., as event information stored in attack events 305 as shown in FIG. 3. Such embodiments may be effective at preventing attacks, while carrying increased risk of disrupting ordinary and desired NFC communications.

At a "Transmit NFC Disruption Signal" block 505, in response to detecting the passive communication mode NFC signal comprising the encoded signature at blocks 503 and 504, computing device 400 may automatically transmit a battery powered NFC disruption signal having a passive communication mode NFC response frequency. The battery powered NFC disruption signal may comprise a larger amplitude, e.g., as a result of being battery powered, than an NFC response signal generated by a proximal PICC. The passive communication mode NFC response frequency may comprise, e.g., a passive PICC subcarrier frequency, such as 12.71 MHz-14.41 MHz, optionally modulated by a bit stream effective to disrupt NFC communications between a proximal PCD and a proximal PICC. In some embodiments, the bit stream may comprise a random bit stream. In some embodiments, the bit stream may comprise artificial PICC data as described herein. Block 505 may be followed by block 506.

At an "Activate Audible Alarm/Send Attack Alert/Record Event Information" block 506, computing device 400 may perform one or more additional automated actions, in addition to transmitting an NFC Disruption Signal at block 505. Computing device 400 may for example automatically activate an audible alarm; automatically send an attack alert communication; and/or automatically record event information for the passive communication mode NFC signal detected at block 503. The term "automatically" as used herein refers to actions performed at computing device 400 without intentional initiation from an external entity such as a user of computing device 400 or a device other than computing device 400.

In addition to illustrated blocks 501-506, CCAP 126 may be adapted to perform a variety of management and update operations. Such operations may involve interactions with a user of computing device 400 and/or interactions with other computing devices such as disruption signal/artificial card data server 361 and/or attack alert server 362. For example, in some embodiments, CCAP 126 may provide UI for a user of computing device 400 to configure CCAP 126 settings. Embodiments may allow users to configure settings such as encoded signature(s) to detect, disruption signal amplitude, whether to use artificial PICC data, alarm sounds, messages, and volume, whether to report attack event information to a payment network, download frequency for new bit streams and artificial card data, or any other settings applicable to CCAP 126. In some embodiments, CCAP 126 may be adapted to occasionally communicate with a server, such as disruption signal/artificial card data server 361 to update encoded signature(s) and bit streams 304, or to adjust CCAP 126 settings.

Figure 6:
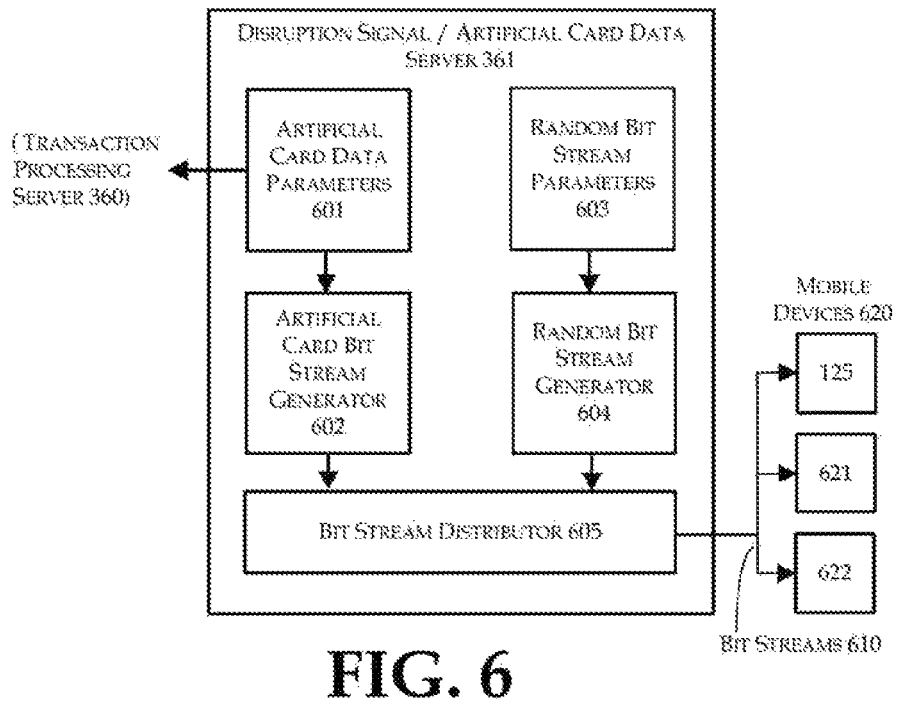
FIG. 6 is a diagram illustrating an example disruption signal/artificial card data server.

FIG. 6 is a diagram illustrating an example disruption signal/artificial card data server, arranged in accordance with at least some embodiments of the present disclosure. In some embodiments, disruption signal/artificial card data server 361 may be arranged as part of a payment network, such as illustrated in FIG. 3. As depicted, disruption signal/artificial card data server 361 may comprise artificial card data parameters 601, an artificial card bit stream generator 602, random bit stream parameters 603, a random bit stream generator 604, and a bit stream distributor 605.

In some embodiments, artificial card data parameters 601 may comprise any desired artificial card data, such an artificial card holder name, artificial account number, and/or artificial expiration date. Artificial card bit stream generator 602 may be configured to generate bit streams comprising artificial card data including artificial card data parameters 601. Bit stream distributor 604 may be configured to distribute bit streams 610, comprising, e.g., bit streams generated by artificial card bit stream generator 602 to mobile devices 620. Meanwhile, disruption signal/artificial card data server 361 may be configured to send artificial card data parameters 601 to transaction processing server 360, so that transaction processing server 360 may recognize attempted transactions comprising artificial card data parameters 601.

Mobile devices 620 may include, e.g., mobile device 125, a mobile device 621, and a mobile device 622. Three mobile devices 620 are illustrated in FIG. 6, although bit stream distributor 604 may be configured to distribute bit streams 610 to more or fewer mobile devices 620 as will be appreciated. In some embodiments, bit stream distributor 604 may distribute bit streams 610 by storing bit streams 610 in bit stream storage locations at mobile devices 620, e.g., in bit streams 304 at mobile device 125.

In some embodiments, artificial card data parameters 601 may comprise complete data for an artificial card, and artificial card bit stream generator 602 may be configured to generate a corresponding artificial card bit stream comprising the complete data for the artificial card. Bit stream distributor 604 may distribute the artificial card bit stream, e.g., an identical artificial card bit stream, to each of mobile devices 620. Artificial card data parameters 601 may be updated as often as desired, e.g., daily, weekly, or monthly, and disruption signal/artificial card data server 361 may be configured to generate and send an updated artificial card bit stream to each of mobile devices 620.

In some embodiments, artificial card data parameters 601 may comprise partial data for an artificial card, and artificial card bit stream generator 602 may be configured to generate multiple different artificial card bit streams comprising the partial data for the artificial card. Bit stream distributor 604 may be configured to distribute different artificial card bit streams to each of mobile devices 620.

In some embodiments, random bit stream parameters 301 may be omitted, and random bit stream generator 604 may generate random bit streams not having any common parameters. Bit stream distributor 604 may be configured to distribute bit streams 610, comprising, e.g., bit streams generated by random bit stream generator 604 to mobile devices 620. Disruption signal/artificial card data server 361 may be configured to generate and send identical or different random bit streams to each of mobile devices 620. Random bit streams may be updated as often as desired, e.g., daily, weekly, or monthly, and disruption signal/artificial card data server 361 may be configured to generate and send an updated random stream to each of mobile devices 620.

In some embodiments, random bit stream parameters 301 may be utilized, and random bit stream generator 604 may be configured to generate random bit streams having common random bit stream parameters 301. For example, certain bit stream properties may be particularly effective at disrupting contactless card communications. Random bit stream parameters 301 may provide rules or properties for generated random bit streams to ensure that random bit streams are effective to disrupt contactless card communications. For example, random bit stream parameters 301 may provide a data rate parameter for random bit streams.

Figure 7:
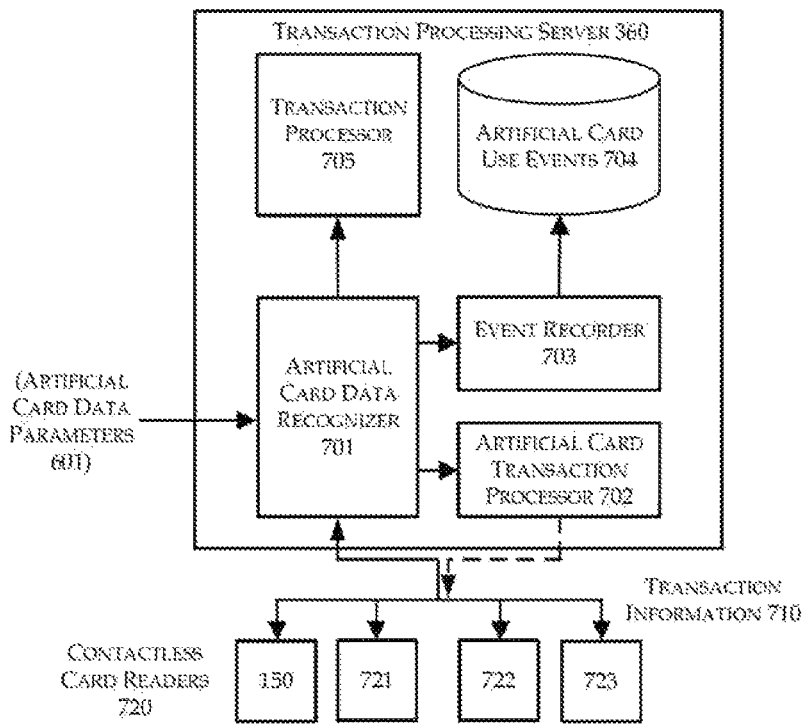
FIG. 7 is a diagram illustrating an example transaction processing server.

FIG. 7 is a diagram illustrating an example transaction processing server, arranged in accordance with at least some embodiments of the present disclosure. In some embodiments, transaction processing server 360 may be arranged as part of a payment network, such as illustrated in FIG. 3. As depicted, transaction processing server 360 may comprise an artificial card data recognizer 701, an artificial card transaction processor 702, an event recorder 703, artificial card use events 704, and a transaction processor 705.

In some embodiments, transaction processing server 360 may be configured to communicate, via a network, with contactless card readers 720. Contactless card readers 720 may comprise, e.g., contactless card reader 150, a contactless card reader 721, a contactless card reader 722, and a contactless card reader 723. Four contactless card readers 720 are illustrated in FIG. 7, although transaction processing server 360 may be configured to communicate with more or fewer contactless card readers 720 as will be appreciated.

Transaction processing server 360 may for example exchange transaction information 710 with any of contactless card readers 720 to process transactions. Received transaction information 710 may comprise, e.g., contactless card account information and transaction amounts. Transaction processor 705 may be configured to authorize transactions submitted via received transaction information 710, and transaction processor 705 may send transaction confirmations or denials to contactless card readers 720.

In addition to ordinary transaction processing operations involving transaction processor 705, transaction processing server 360 may pass received transaction information 710 to artificial card data recognizer 701. Artificial card data recognizer 701 may be configured to receive artificial card data parameters 601, e.g., from disruption signal/artificial card data server 361, and artificial card data recognizer 701 may be configured to scan received transaction information 710 for artificial card data parameters 601.

When artificial card data recognizer 701 recognizes artificial card data parameters 601 in received transaction information 710, artificial card data recognizer 701 may be configured to provide received transaction information 710, along with any other event details including, e.g., identification information for the submitting contactless card reader, to event recorder 703. Event recorder 703 may be configured to store received transaction information 710 and any other event details in artificial card use events 704. Artificial card use events 704 may be stored and analyzed and/or used for law enforcement investigations.

When artificial card data recognizer 701 recognizes artificial card data parameters 601 in received transaction information 710, artificial card data recognizer 701 and/or transaction processor 705 may be configured to deny the submitted transaction, e.g., by sending a transaction denial message to the submitting contactless card reader. In some embodiments, optionally in advance of denying the submitted transaction, artificial card data recognizer 701 may be configured to activate artificial card transaction processor 702. Artificial card transaction processor 702 may be configured to take any of a variety of actions to collect further information. For example, in some embodiments, artificial card transaction processor 702 may be configured to send a message to the submitting contactless card reader, instructing the contactless card holder to enter further information, such as a social security number, birthday, zip code, fingerprint, or other information to identify himself. In some embodiments, artificial card transaction processor 702 may be configured to send a message to the submitting contactless card reader, instructing the contactless card holder to please wait, while meanwhile artificial card transaction processor 702 may notify a store manager, police or security regarding a potential fraud attempt. In some embodiments, artificial card transaction processor 702 may be configured to activate a camera at or near the submitting contactless card reader to capture a photograph of the contactless card holder.

Figure 8:
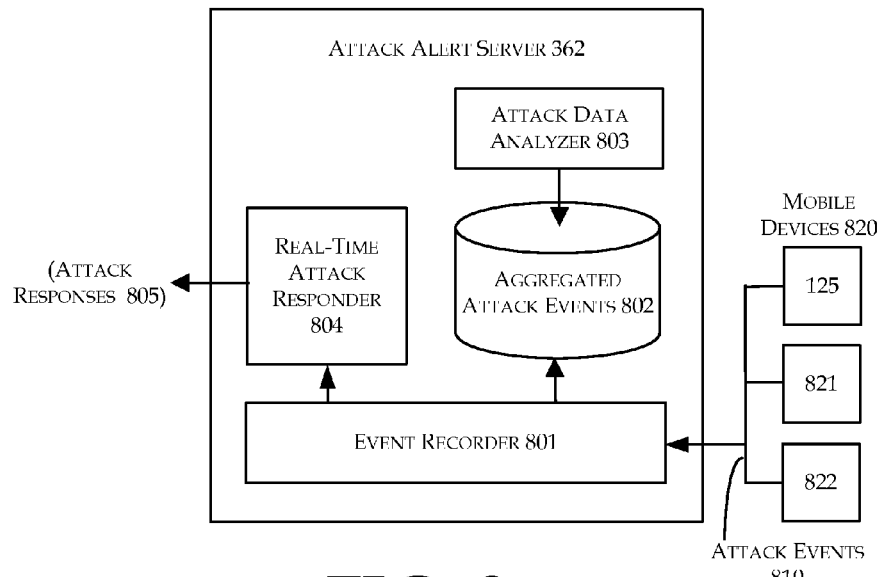
FIG. 8 is a diagram illustrating an example attack alert server, all arranged in accordance with at least some embodiments of the present disclosure.

FIG. 8 is a diagram illustrating an example attack alert server, arranged in accordance with at least some embodiments of the present disclosure. In some embodiments, attack alert server 362 may be arranged as part of a payment network, such as illustrated in FIG. 3. As depicted, attack alert server 362 may comprise an event recorder 801, aggregated attack events 802, an attack data analyzer 803, and/or a real-time attack responder 804.

Attack alert server 362 may be configured to receive attack events 810 from mobile devices 820. Mobile devices 820 may comprise, e.g., mobile device 125, a mobile device 821, and a mobile device 822. Three mobile devices 820 are illustrated in FIG. 8, although attack alert server 362 may be configured to communicate with more or fewer mobile devices 820 as will be appreciated. Attack events 810 may comprise attack event information gathered by any of mobile devices 820, e.g., attack events 305 from mobile device 125.

In some embodiments, event recorder 801 may be configured to store received attack events 810 in aggregated attack events 802. As multiple attack events are stored from multiple mobile devices, useful patterns may emerge within aggregated attack events 802. Attack data analyzer 803 may be configured to identify attack patterns within aggregated attack events 802. For example, multiple attack events may record similar geographic locations, times of day, days of the week, or days of the year. Certain card holders, or certain card holder types, may experience more attack events than others. Card holder types may comprise, e.g., card holders of a common age group, card holders from a same city, card holders living in cities over some threshold size, etc. Cards issued by certain banks or other card issuers may experience more attack events than others. Attack data analyzer 803 may be configured to identify these and any other patterns in aggregated attack events 802.

In some embodiments, attack alert server 362 may provide attack events 810 to real-time attack responder 804. Real-time attack responder 804 may be configured to take any of a variety of real-time actions responsive to an attack event. For example, in some embodiments, real-time attack responder 804 may be configured to send attack responses 805, comprising, e.g., a notification to a mobile device that submitted the attack event, a notification to a card holder associated with the attack event, and/or a notification to a store manager, police or security regarding the attack event. In some embodiments, real-time attack responder 804 may be configured to activate a camera at or near the location of the attack event to capture a photograph of the location of the attack event.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disc (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A mobile computing device method to prevent contactless card attacks, comprising:
    monitoring, by a mobile computing device comprising a Near Field Communications (NFC) module, the NFC module for passive communication mode NFC signals comprising encoded signatures;
    detecting, by the mobile computing device, during the monitoring of the NFC module, a passive communication mode NFC signal comprising an encoded signature;
    in response to detecting the passive communication mode NFC signal comprising the encoded signature, automatically transmitting, by the mobile computing device, a battery powered NFC disruption signal, wherein the NFC disruption signal comprises a passive communication mode NFC response frequency, and wherein the NFC disruption signal comprises a passive Proximity Integrated Circuit Card (PICC) subcarrier frequency modulated by a bit stream effective to disrupt NFC communications between a proximal Proximity Coupling Device (PCD) and a proximal PICC; and
    pausing, by the mobile computing device, the monitoring of the NFC module during use of the NFC module by an NFC application at the mobile computing device.

2. The mobile computing device method of claim 1, wherein the NFC disruption signal comprises a larger amplitude than an NFC response signal generated by the proximal PICC.

3. The mobile computing device method of claim 1, wherein the bit stream that modulates the NFC disruption signal comprises a random bit stream.

4. The mobile computing device method of claim 1, wherein the bit stream that modulates the NFC disruption signal comprises artificial PICC data, wherein the artificial PICC data includes PICC data different from card holder PICC data associated with the proximal PICC.

5. The mobile computing device method of claim 1, wherein the passive communication mode NFC signals comprise one or more of 13.56 MHz signals generated by the proximal PCD or 12.7 MHz-14.40 MHz sideband signals generated by the proximal PICC, and wherein the NFC disruption signal comprises 12.7 MHz-14.40 MHz sideband signals.

6. The mobile computing device method of claim 1, wherein the encoded signature comprises at least a portion of a passive communication mode NFC preamble generated by the proximal PCD.

7. The mobile computing device method of claim 6, wherein the passive communication mode NFC preamble comprises a sequence including 48 zeroes.

8. The mobile computing device method of claim 1, wherein the encoded signature comprises contactless card information generated by the proximal PICC.

9. The mobile computing device method of claim 1, wherein monitoring the NFC module is performed substantially continuously by the mobile computing device over at least one period of 10 minutes or longer.

10. The mobile computing device method of claim 1, further comprising one or more of:
    automatically activating an audible alarm by the mobile computing device in response to detecting the passive communication mode NFC signal comprising the encoded signature;
    automatically sending an attack alert communication by the mobile computing device in response to detecting the passive communication mode NFC signal comprising the encoded signature; or automatically recording, by the mobile computing device in response to detecting the passive communication mode NFC signal comprising the encoded signature, event information for the detected passive communication mode NFC signal.

11. A mobile computing device configured to prevent contactless card attacks, comprising:
a Near Field Communications (NFC) module;
a battery;
a processor;
a memory; and
a contactless card attack preventer stored in the memory and executable by the processor, wherein the contactless card attack preventer is configured to:
monitor the NFC module for passive communication mode NFC signals comprising encoded signatures;
detect, during monitoring of the NFC module, a passive communication mode NFC signal comprising an encoded signature;
in response to detecting the passive communication mode NFC signal comprising the encoded signature, automatically transmit a battery powered NFC disruption signal, wherein the NFC disruption signal comprises a passive communication mode NFC response frequency, and wherein the NFC disruption signal comprises a passive Proximity Integrated Circuit Card (PICC) subcarrier frequency modulated by a bit stream effective to disrupt NFC communications between a proximal Proximity Coupling Device (PCD) and a proximal PICC; and
pause monitoring of the NFC module during use of the NFC module by an NFC application at the mobile computing device.

12. The mobile computing device of claim 11, wherein the NFC disruption signal comprises a larger amplitude than an NFC response signal generated by the proximal PICC.

13. The mobile computing device of claim 11, wherein the bit stream that modulates the NFC disruption signal comprises a random bit stream.

14. The mobile computing device of claim 11, wherein the bit stream that modulates the NFC disruption signal comprises artificial PICC data, wherein the artificial PICC data includes PICC data different from card holder PICC data associated with the proximal PICC.

15. The mobile computing device of claim 11, wherein the passive communication mode NFC signals comprise one or more of 13.56 MHz signals generated by the proximal PCD or 12.7 MHz-14.40 MHz sideband signals generated by the proximal PICC, and wherein the NFC disruption signal comprises 12.7 MHz-14.40 MHz sideband signals.

16. The mobile computing device of claim 11, wherein the encoded signature comprises at least a portion of a passive communication mode NFC preamble generated by the proximal PCD.

17. The mobile computing device of claim 16, wherein the passive communication mode NFC preamble comprises a sequence including 48 zeroes.

18. The mobile computing device of claim 11, wherein the encoded signature comprises contactless card information generated by the proximal PICC.

19. The mobile computing device of claim 11, wherein the contactless card attack preventer is configured to monitor the NFC module substantially continuously over at least one period of 10 minutes or longer.

20. The mobile computing device of claim 11, wherein the contactless card attack preventer is configured to one or more of:
automatically activate an audible alarm at the mobile computing device in response to detecting the passive communication mode NFC signal comprising the encoded signature;
automatically send an attack alert communication by the mobile computing device in response to detecting the passive communication mode NFC signal comprising the encoded signature; or
automatically record, in response to detecting the passive communication mode NFC signal comprising the encoded signature, event information for the detected passive communication mode NFC signal.

21. A non-transitory computer readable storage medium having computer executable instructions executable by a processor at a mobile device, the instructions that, when executed by the processor, cause the processor to:
monitor a Near Field Communications (NFC) module within the mobile device for passive communication mode NFC signals comprising encoded signatures;
detect, during monitoring of the NFC module, a passive communication mode NFC signal comprising an encoded signature;
in response to detecting the passive communication mode NFC signal comprising the encoded signature, automatically transmit a battery powered NFC disruption signal, wherein the NFC disruption signal comprises a passive communication mode NFC response frequency, and wherein the NFC disruption signal comprises a passive Proximity Integrated Circuit Card (PICC) subcarrier frequency modulated by a bit stream effective to disrupt NFC communications between a proximal Proximity Coupling Device (PCD) and a proximal PICC; and
pause monitoring of the NFC module during use of the NFC module by an NFC application at the mobile computing device.

* * * * *